June 14, 1927.
E. J. BLOOM
1,632,724
TERMINAL CONSTRUCTION FOR CENTRAL LUBRICATING INSTALLATIONS
Original Filed May 19, 1922
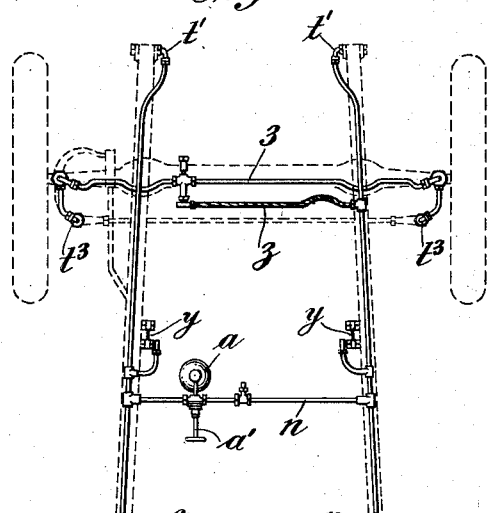
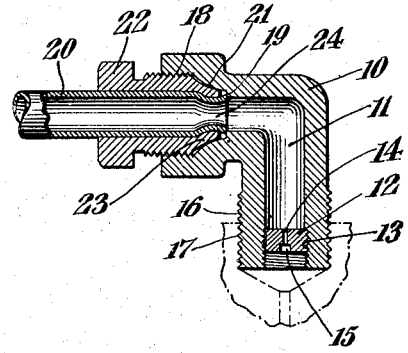
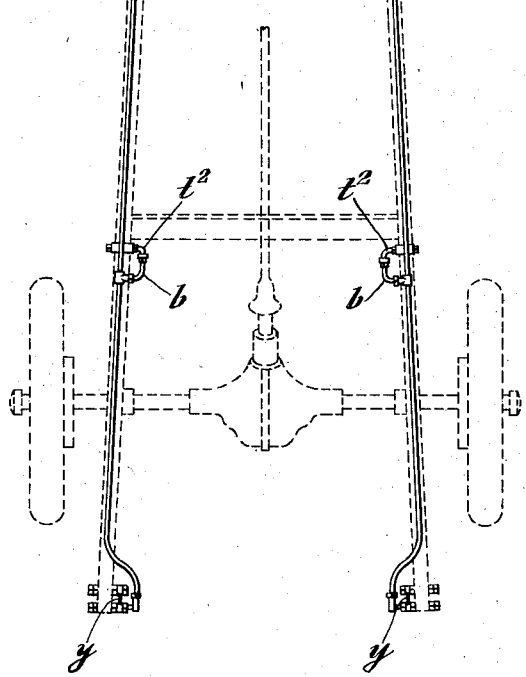
Inventor
Edgar J. Bloom
By his Attorneys
Dean, Fairbank, Obrecht & Hirsch

Patented June 14, 1927.

1,632,724

UNITED STATES PATENT OFFICE.

EDGAR J. BLOOM, OF TIFFIN, OHIO, ASSIGNOR, BY MESNE ASSIGNMENTS, TO AUTO RESEARCH CORPORATION, A CORPORATION OF DELAWARE.

TERMINAL CONSTRUCTION FOR CENTRAL LUBRICATING INSTALLATIONS.

Original application filed May 19, 1922, Serial No. 562,090. Divided and this application filed August 6, 1926. Serial No. 127,493.

My present invention relates to fluid distributing terminals or outlets, and in its preferred application to the lubricator terminals through which the bearings are supplied from a central lubricating installation.

Among the objects of the invention are to provide lubricator terminals of rugged construction, which are applied with facility at the bearings and provide a secure mounting for the outlet pipe ends as well as a dust-tight passage therethrough to the bearings, and which are so compact as to present no protruding parts likely to be knocked off when used in a central lubricating system on the chassis of an automobile.

Another object is to provide terminal devices of the type referred to, comprising simple fittings of uniform construction, the rating of which is determined wholly by interchangeable rating plugs or fillers within the fittings.

This application is a division of my co-pending application, Serial No. 562,090, filed May 19th, 1922.

In the accompanying drawings in which is shown one of various possible embodiments of the several features of the invention, Fig. 1 is a diagrammatic view of an automobile chassis, equipped with a central lubricating system embodying my terminals, Fig. 2 is an end elevation of one of the terminal fittings, and;

Fig. 3 is a sectional view thereof on line 3—3 of Fig. 2.

The drawings show an installation comprising a tank $a$ delivering to a pump, the operating handle $a'$ of which is accessible from the driver's seat. The piping installation comprises a transverse main $n$ supplied from the pump and feeding at its ends into mains $r$ and $o$, longitudinally of the channel frames. The forward ends of said mains lead to the corresponding spring bolt bearings through lubricator terminals $t'$ of the construction shown in Figs. 2 and 3 and hereinafter described. Similar lubricator terminals $t^2$ are applied at the front bolts of the rear spring and connected to the corresponding mains through branch pipes $b$. The spring shackles $y$ are preferably supplied through the constructions shown and claimed in my copending application, Serial No. 562,060, filed May 19th, 1922. Other lubricator terminals $t^3$ also of the construction shown in Figs. 2 and 3 are located on the front axle and supplied from the ends of an axle main 3, to which the lubricant is conveyed from main $r$ through a flexible hose $z$. The specific axle lubricating construction need not be further described as it is the subject-matter of a copending application, Serial No. 127,494, filed concurrently herewith. Any number of additional bearings (not shown) may be supplied through further terminals, similar to those shown in Figs. 2 and 3.

Each of the lubricator terminals, one of which is shown separately in Figs. 2 and 3, comprises a unitary fitting having a filler or plug carried therein, determining the impedance to flow of lubricant therethrough, said fittting intended to be plugged at its outlet into the bearing to be supplied therefrom and having a conformation at its protruding part for application thereto of the extremity of the corresponding supply pipe.

In a desirable specific construction shown, the terminal lubricator comprises a tubular fitting 10, illustratively of elbow form having a longitudinal bore 11 therethrough of diameter small compared to its length. Within the tube is carried a flow obstruction resistance or impedance, comprising a plug preferably a rigid or metal plug 12, determining a minute obstructing or metering passage. This plug in the embodiment shown is fixed as by threading at 13 into the bore of the fitting and has a minute axial hole 14 therein through which the lubricant passes. The plug is provided with a fillister slot 15 at its outer end by which it may readily be applied with the use of a screw driver.

The outlet end of the fitting may be exteriorly threaded at 16 for application directly into a correspondingly tapped hole 17 in the fixed bearing member, diagrammatically indicated in dotted lines. At the inlet end, the fitting is provided with a coupling conformation for attachment thereto of the corresponding extremity of the pipe system. As shown, the bore at the inlet end of the fitting is enlarged and tapped at 18 and affords a stop shoulder 19 for the extremity of the pipe 20 and the metal of the fitting is formed with a curved or wedging shoulder 21 adjacent said stop. A compression coupling nut 22 encircles the extremity of the pipe, is threaded into the socket and has a reduced inner end 23 wedged inward by the shoulder 21 in the fitting as the coupling nut 22 is tightened and thereby constricting the pipe as at 24 thereat to effect a secure lubricant-tight joint.

My construction of lubricant terminal lends itself readily for use in central chassis lubricating installations. The pre-assembled fittings 10 with their enclosed plugs 12 are merely screwed into the various bearings on the vehicle, and the corresponding pipe extremities are successively connected, each by passing its coupling nut 22 thereover, inserting the pipe extremity into the fitting, as far as it will go and then tightening the coupling nut.

In use, each of the minute outlet apertures 14 at the various lubricators determines the rate of lubricant exit following a pressure application at the pump $a'$, so that the distribution of lubricant is accurately controlled. The lubricant is thus passed directly into each bearing through a dust-tight non-leaking enclosed passageway. The loss of lubricant and entry of dirt and water incurred by dripping through an open air gap is thus wholly obviated.

My terminal lubricator is a compact, small volume fitting part, not essentially a storage or supply reservoir or cup of substantial volume. It measures or meters rate alone, and not quantity of flow as would an ordinary oil or grease cup.

With the use of a common fitting 10, lubricator terminals of different ratings may be assembled by merely providing metering plugs 12 with apertures 14 of different diameters or ratings which may be interchangeably mounted in the fitting depending on the rate desired.

I claim:—

1. A lubricator terminal comprising a unitary pipe fitting having a longitudinal bore therethrough, one end of said fitting being externally threaded for application into a bearing, the other end being conformed for application of a pipe end in fluid-tight relation with respect thereto, and a rigid flow obstructing filler member disposed within said fitting and determining a minute passage therethrough, whereby with the use of a pipe fitting of uniform construction, a terminal of desired selected metered flow rate may be provided by the use of a filler of corresponding rating, determining substantially the exact size of the minute passage desired and means constituting part of the assembled uninstalled terminal for retaining said filler in said fitting.

2. A set of lubricator terminals of various fixed ratings, comprising similar pipe fittings, each of said fittings having a longitudinal bore therein, one end of said fitting being externally threaded for application into a bearing, the other end being conformed for application of a pipe end in fluid-tight relation with respect thereto, and rigid filler members obstructing said fittings, each determining a minute invariant open passage, the magnitude of which governs the rating of the fitting, said filler members being interchangeably insertable in said similar pipe fittings, said fillers being entirely enclosed in said fittings when the latter are installed, the rating of each terminal being determined by the rating of the filler member inserted therein.

Signed at Tiffin, in the county of Seneca and State of Ohio, this 31st day of July, A. D. 1926.

EDGAR J. BLOOM.